US012767827B2

(12) United States Patent
Doni et al.

(10) Patent No.: US 12,767,827 B2
(45) Date of Patent: Oct. 20, 2026

(54) SULPHUR ADDITIVE AND SULPHUR MODIFIED BITUMEN

(71) Applicant: HINDUSTAN PETROLEUM CORPORATION LIMITED, Bangalore (IN)

(72) Inventors: Eswararao Doni, Bangalore (IN); Siva Kesava Raju Chinthalapati, Bangalore (IN); Raghava Krishna Kanala, Bangalore (IN); Narayanan Krishnamurthy, Bangalore (IN); Ravi Balasubramaniam, Bangalore (IN)

(73) Assignee: HINDUSTAN PETROLEUM CORPORATION LIMITED, Bangalore (IN)

( * ) Notice: Subject to any disclaimer, the term of this patent is extended or adjusted under 35 U.S.C. 154(b) by 747 days.

(21) Appl. No.: 17/995,059

(22) PCT Filed: Jan. 12, 2021

(86) PCT No.: PCT/IN2021/050030
§ 371 (c)(1),
(2) Date: Sep. 29, 2022

(87) PCT Pub. No.: WO2021/205465
PCT Pub. Date: Oct. 14, 2021

(65) Prior Publication Data

US 2023/0130068 A1 Apr. 27, 2023

(30) Foreign Application Priority Data

Apr. 6, 2020 (IN) ............................. 202041015175

(51) Int. Cl.

| | |
|---|---|
| ***C08L 95/00*** | (2006.01) |
| ***C08K 13/02*** | (2006.01) |
| ***C08K 13/08*** | (2006.01) |
| ***E01C 7/26*** | (2006.01) |
| *C08K 3/06* | (2006.01) |
| *C08K 3/34* | (2006.01) |
| *C08K 5/098* | (2006.01) |
| *C08K 5/105* | (2006.01) |
| *C08K 11/00* | (2006.01) |

(52) U.S. Cl.
CPC .............. *C08L 95/00* (2013.01); *C08K 13/02* (2013.01); *C08K 13/08* (2013.01); *E01C 7/267* (2013.01); *C08K 3/06* (2013.01); *C08K 3/346* (2013.01); *C08K 5/098* (2013.01); *C08K 5/105* (2013.01); *C08K 11/005* (2013.01); *C08K 2201/014* (2013.01); *C08L 2555/54* (2013.01)

(58) Field of Classification Search
CPC ...................................................... C08L 95/00
See application file for complete search history.

(56) References Cited

U.S. PATENT DOCUMENTS

| | | | | | |
|---|---|---|---|---|---|
| 2,182,837 | A * | 12/1939 | Bacon | C10C 3/023 | 404/79 |
| 3,960,585 | A | 6/1976 | Gaw | | |
| 4,902,408 | A * | 2/1990 | Reichert | C10G 29/06 | 208/243 |
| 5,271,767 | A * | 12/1993 | Light, Sr. | C08L 95/00 | 106/248 |
| 7,037,955 | B2 * | 5/2006 | Timcik | C08L 95/00 | 208/15 |
| 7,905,949 | B2 | 3/2011 | Crews et al. | | |
| 2003/0037704 | A1 | 2/2003 | Bailey et al. | | |
| 2008/0069638 | A1 | 3/2008 | Crews et al. | | |
| 2011/0146531 | A1 * | 6/2011 | Mitra | C08L 95/00 | 106/18.11 |
| 2011/0290151 | A1 * | 12/2011 | Chughtai | C08L 95/00 | 106/274 |
| 2020/0181507 | A1 * | 6/2020 | Martin | C08L 95/00 | |
| 2020/0277498 | A1 * | 9/2020 | Tong | C08L 95/00 | |

FOREIGN PATENT DOCUMENTS

| | | | | |
|---|---|---|---|---|
| CA | 2695829 | A1 | 2/2009 | |
| EP | 1704178 | A1 | 9/2006 | |
| EP | 2539402 | A1 | 1/2013 | |
| EP | 2771405 | B1 | 12/2018 | |
| GB | 1494198 | A * | 12/1977 | C08K 3/16 |
| WO | 2011015773 | A2 | 2/2011 | |
| WO | WO-2011074003 | A2 * | 6/2011 | C08L 95/00 |
| WO | 2016151481 | A1 | 9/2016 | |

OTHER PUBLICATIONS

International Search Report and Written Opinion, European International Search Authority, May 10, 2021, from PCT/IN2021/050030.
Indian Examination Report, Aug. 29, 2022, from India Patent Application No. 202041015175.
Sakib, Nazmus et al., "A review of the evolution of technologies to use sulphur as a pavement construction material", International Journal of Pavement Engineering, May 10, 2019.

(Continued)

*Primary Examiner* — Alexandra M Moore
(74) *Attorney, Agent, or Firm* — Workman Nydegger

(57) ABSTRACT

The present disclosure discloses an additive for preparing modified bitumen comprising a) sulphur with a weight percentage in the range of 90-95% with respect to the additive; b) at least two $H_2S$ suppressants with a combined weight percentage in the range of 4-7% with respect to the additive; c) bitumen with a weight percentage in the range of 0.5-3% with respect to the additive; and d) at least one smell masking agent in the range of 0.05-1.0% with respect to the additive. The present disclosure provides a convenient process for the preparation of the additive. The present disclosure also reveals a sulphur modified bitumen and a process for preparing the sulphur modified bitumen.

5 Claims, No Drawings

(56) References Cited

OTHER PUBLICATIONS

"Commission Directive 2009/161/EU of Dec. 17, 2009 establishing a third list of indicative occupational exposure limit values in implementation of Council Directive 98/24/EC and amending Commission Directive 2000/39/EC", Official Journal of the European Union, vol. 337, Dec. 19, 2009, pp. 87-89.

Feng, Wenguo et al., "Adsorption of Hydrogen Sulfide onto Activated Carbon Fibers: Effect of Pore Structure and Surface Chemistry", Environ. Sci. Technology, Oct. 10, 2005, vol. 39, No. 24, pp. 9744-9749.

Daniels, William et al., "Health Hazard Evaluation Report (sulfur extended asphalt, hydrogen sulfide exposures)", Aug. 1, 1983, pp. 1-24, Wisconsin, USA.

Shah, Mansi S. et al., "Hydrogen Sulfide Capture: From Absorption in Polar Liquids to Oxide, Zeolite, and Metal-Organic Framework Adsorbents and Membranes", American Chemical Reviews, Jul. 5, 2017, 117, pp. 9755-9803.

"Hydrogen Sulphide (H2S) in Bitumen Emissions", Nov. 1, 2016, pp. 1-1.

"IS 73 (2013): Paving bitumen [PCT 6: Petroleum, Coal, and Related Products]; Indian Standard, Bitumen Specification", ICS 93.080.20, Apr. 1, 2013, New Delhi, India.

Ma, Xiaoliang et al., "A novel method for oxidative desulfurization of liquid hydrocarbon fuels based on catalytic oxidation using molecular oxygen coupled with selective adsorption", Catalysis Today, 2007, 123, pp. 276-284.

Rubright, Samantha et al., "Environmental toxicology of hydrogen sulfide", Nitric Oxide, Oct. 7, 2017, pp. 1-13.

Stepova, Kateryna et al., "Modified bentonites as adsorbents of hydrogen sulfide gases", Applied Clay Science, May 16, 2008, 42, pp. 625-628.

Drager, "Monitoring Hydrogen Sulfide (H2S) to meet new exposure standards—Occupational Heath & Safety; 2010 ACGIH guidelines", Sep. 1, 2011, pp. 1-4.

Nguyen-Thanh, Danh et al., "Adsorption of hydrogen sulfide on montmorillonites modified with iron", Chemosphere, Oct. 19, 2004, 59, pp. 343-353.

"Potential Risks of Hydrogen Sulphide Through the Bitumen Manufacture and Delivery Process; D/2021/7512/32; 2nd edition 2021", Mar. 1, 2021, pp. 1-9.

Timm, David et al., "Evaluation of Mixture Performance and Structural Capacity of Pavements Utilizing Shell Thiopave, Phase II: Construction, Laboratory Evaluation and Full-Scale Testing of Thiopave Test Sections—Final Report", National Center for Asphalt Technology Report 12-07, Aug. 2012.

Javadli, Rashad et al., "Desulfization of heavy oil", Appl Petrochem Res, Mar. 1, 2012, 1:3-19.

Amosa, M.K. et al., "Sulphide Scavengers in Oil and Gas Industry—A Review", NAFTA Scientific Journal, 61, Feb. 1, 2010, 2, pp. 85-92.

"The Bitumen Industry—A Global Perspective, IS-230, Third Edition", Jan. 1, 2015, pp. 1-60.

Beatty, Tommy L. et al., "Field Evaluation of Sulfur-Extended Asphalt Pavements", Transportation Research Record 1115, Jan. 1, 1987, pp. 161-170.

Kumar, Anand et al., "Critical Review of the Suitability of Sulphur as a Component in Various Civil Engineering Applications", Dissertation, Final Project Report, Sep. 2013, Tronoh, Perak, Malaysia.

Nicholls, J C, "Review of Shell Thiopave sulphur-extended asphalt modifier", TRL Report TRL672, 2009.

* cited by examiner

SULPHUR ADDITIVE AND SULPHUR MODIFIED BITUMEN

FIELD OF THE INVENTION

The present disclosure in general relates to the field of bitumen modification. In particular, the present disclosure relates to a sulphur additive for modifying bitumen, a sulphur modified bitumen composition, and their process of preparation.

BACKGROUND OF THE INVENTION

Bitumen corresponds to the heaviest fraction obtained from crude oil distillation comprising aliphatic, aromatic, and naphthenic hydrocarbon compounds containing heteroatoms, such as nitrogen, oxygen, and sulphur. Bitumen is primarily employed to provide waterproofing and binding properties in engineering applications, especially in road construction. It is also highly resistive to the actions of most acids, alkalis, and salts. Bitumen is normally used in road pavements, however the increasing traffic loads, temperature variations between warm and cold months and insufficient maintenance cause road pavements to suffer severe distresses. To overcome these problems and improve the mechanical properties of bitumen, base bitumen is modified with a number of additives such as rubber, synthetic polymer additives, sulphur, etc. Use of sulphur, a low value by-product from refineries, as an additive reduces asphalt consumption and affords economic benefits to refineries along with improving the quality of base bitumen. But, the usage of sulphur as an additive releases poisonous and foul-smelling gases, such as $SO_2$, $H_2S$ during the bitumen modification or road paving. These gases cause environmental and health problems.

U.S. Pat. No. 7,905,949B2 discloses a method for producing bituminous compositions modified using emulsifiers and water. Emulsifiers used included amphoteric emulsifiers, cationic emulsifiers and nonionic emulsifiers. WO2011015773A2 discloses a bituminous composition comprising polycondensates, such as polyurethanes, polyamides and a process for producing the composition.

However, modified bitumen containing the polymeric compositions tend to separate out easily, as a result, have poor long-term storage stability and consequently lose their properties. Hence, there are wide investigations to identify suitable bitumen modification. Also, bitumen modification with reduced hydrogen sulphides has been challenging till today and there exists an undoubted necessity for a bitumen composition which can have increased mechanical properties as well as decreased $H_2S$ emission.

SUMMARY OF THE INVENTION

In an aspect of the present disclosure, there is provided an additive for preparing modified bitumen, the additive comprising: a) sulphur with a weight percentage in the range of 90-95% with respect to the additive; b) at least two $H_2S$ suppressants with a combined weight percentage in the range of 4-7% with respect to the additive; c) bitumen with a weight percentage in the range of 0.5-3% with respect to the additive; and d) at least one smell masking agent in the range of 0.05-1.0% with respect to the additive.

In another aspect of the present disclosure, there is provided an additive for preparing modified bitumen, the additive comprising: a) sulphur with a weight percentage in the range of 82-90% with respect to the additive; b) at least two $H_2S$ suppressants with a combined weight percentage in the range of 4-7% with respect to the additive; c) bitumen with a weight percentage in the range of 0.5-3% with respect to the additive; d) at least one smell masking agent with a weight percentage in the range of 0.05-1.0% with respect to the additive; and e) at least one olefin rich oil with a weight percentage in the range of 7-10% with respect to the additive.

In yet another aspect of the present disclosure, there is provided a process for the preparation of an additive, said process comprising: a) heating sulphur to obtain molten sulphur; b) contacting the molten sulphur with at least two $H_2S$ suppressants, bitumen, and at least one smell masking agent to obtain a mixture; c) heating the mixture at a temperature in the range of 120-160° C. for a time period in the range of 20 minutes to 140 minutes to obtain a heated mixture; and d) cooling the heated mixture to obtain the additive.

In one another aspect of the present disclosure, there is provided a process for the preparation of an additive, said process comprising the following steps: a) heating sulphur to obtain molten sulphur; b) contacting the molten sulphur with at least one olefin rich oil at a temperature in the range of 120-160° C. for a time period in the range of 20 minutes to 200 minutes to obtain a first mixture; c) heating the first mixture with at least two $H_2S$ suppressants, bitumen and smell masking agent at a temperature in the range of 120-160° C. for a time period in the range of 20 minutes to 140 minutes to obtain a heated mixture; and d) cooling the heated mixture to obtain the additive.

In a further aspect of the present disclosure, there is provided a sulphur modified bitumen composition comprising: a) bitumen in the range of 92-97% with respect to the composition; and b) at least one sulphur additive in the range of 3-8% with respect to the composition;

In one another aspect of the present disclosure, there is provided a process for the preparation of sulphur modified bitumen composition, the process comprising: a) heating bitumen to obtain molten bitumen; and b) contacting molten bitumen with at least one sulphur additive to obtain sulphur modified bitumen composition.

These and other features, aspects, and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

DETAILED DESCRIPTION OF THE INVENTION

Those skilled in the art will be aware that the present disclosure is subject to variations and modifications other than those specifically described. It is to be understood that the present disclosure includes all such variations and modifications. The disclosure also includes all such steps, features, compositions and compounds referred to or indicated in this specification, individually or collectively, and any and all combinations of any or more of such steps or features.

Definitions

For convenience, before further description of the present disclosure, certain terms employed in the specification, and examples are collected here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only".

The term "additive" as used herein refers to a compound prepared specifically for the purpose of modification of another material. In the present disclosure, the term "additive" refers to a compound prepared as disclosed herein that is used for modifying bitumen. The term "additive" refers to "sulphur additive" or "organic sulphur additive". The terms "additive", "sulphur additive" can be used interchangeably. Organic sulphur additive refers to additive comprising olefin rich oil wherein sulphur additive is devoid of olefin rich oil.

The term "bitumen" as used herein refers to a black viscous mixture of hydrocarbons obtained naturally or as a residue from petroleum distillation. In the present disclosure, bitumen refers to the black viscous product obtained by refining crude oil. Bitumen is also called Asphalt and the terms "bitumen" and "asphalt" can be used interchangeably.

The term "modified bitumen" as used herein refers to bitumen modified with an additive of the present disclosure.

The term "$H_2S$ suppressants" as used herein refers to a compound or a group of compounds that is capable of suppressing the formation of $H_2S$ or emission of $H_2S$. In the present disclosure, $H_2S$ suppressants refer to compounds which can eliminate/minimize the emission of $H_2S$ gas in the modified bitumen.

The term "smell masking agent" as used herein refers to a chemical compound that can eliminate foul/unpleasant odours by chemically reacting, counter-acting, neutralizing and dissolving the odours and toxic gases. In the present disclosure, smell masking agent can mask the odour of hydrogen sulphide gas and also scavenges $H_2S$ gas, thereby eliminating/minimizing $H_2S$ emission.

The term "refinery by-product" as used herein refers to secondary chemicals that are produced in refining crude oil. In the conversion of crude oil into petroleum products various undesired components are obtained and are referred to as refinery by-products. When refining the crude oil, sulphur and other heteroatoms present in it are separated as by-products. In the present disclosure, sulphur used for bitumen modification is the refinery by-product. Thereby the additive composition of the present disclosure is economical.

The term "iron complex" as used herein refers to compounds containing iron along with ligand forming an iron complex. In the present disclosure, iron complex refers to compound iron (III) ethylhexanoate ($Fe(EHA)_3$).

The term "bentonite clay" as used herein refers to aluminium phyllosilicate clay comprising mostly montmorillonite.

The term "wood charcoal" as used herein refers to the hard, porous, highly carbonaceous product formed during the heating of wood without or with limited air.

The term "refinery spent catalyst" as used herein refers to a catalyst that is "spent" and it no longer exhibits the necessary activity or specificity required. In the present disclosure, the refinery spent catalyst refers to catalysts discharged from different refinery processing units. In the present disclosure, the refinery spent catalyst is selected from a group consisting of refinery FCC (Fluid Catalytic Cracking) spent catalyst, refinery DHDS (Diesel Hydrodesulphurization) spent catalyst, and combinations thereof.

The term "olefin rich oil" as used herein refers to olefin containing oil obtained as a product from refineries or from domestic used oils. In the present disclosure, olefin rich oil includes high cut FCC naphtha, visbreaker naphtha, delayed coker naphtha, waste cooking oil, and combinations thereof.

The term "VG 30 (IS 73, 2013) specification" as used herein refers to a grade of bitumen that can be primarily used to construct extra heavy duty Bitumen pavements that need to endure substantial traffic loads.

The term "penetration point" as used herein refers to a measure of hardness or consistency of bituminous material. It also refers to the consistency of bituminous material and suitability of bitumen for use under different climatic conditions and various types of construction. In the present disclosure, the penetration point of the modified bitumen should be minimum 45 at 25° C.

The term "softening point" as used herein refers to the mean of the temperatures at which the bitumen disks soften and sag downwards a distance of 25 mm under the weight of a steel ball. In the present disclosure, the softening point of the modified bitumen should be a minimum of 47° C.

The term "absolute viscosity" as used herein refers to the measure of a fluid's resistance to flow. Absolute viscosity at 60° C. for the modified bitumen of the present disclosure is in the range of 2400-3600 poises.

The term "kinematic viscosity" as used herein refers to a measure of a fluid's internal resistance to flow under gravitational forces. In the present disclosure, kinematic viscosity at 135° C. for the modified bitumen is measured and should be a minimum of 350 cSt (centistokes).

The term "surface paving" as used herein refers to covering or laying a surface using a durable material. In the present disclosure, surface paving refers to laying the modified bitumen over the roads, walkaways or wherever essentially required.

Throughout this specification, unless the context requires otherwise the word "comprise", and variations such as "comprises" and "comprising", will be understood to imply the inclusion of a stated element or step or group of element or steps but not the exclusion of any other element or steps.

The term "including" is used to mean "including but not limited to", "including" and "including but not limited to" are used interchangeably.

Unless defined otherwise, all technical and scientific terms used herein have the same meaning as commonly understood to one of ordinary skill in the art to which this disclosure belongs. Although methods and materials similar or equivalent to those described herein can be used in the practice or testing of the disclosure, the preferred methods, and materials are now described. All publications mentioned herein are incorporated herein by reference.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight percentage of about 82% to 90% should be interpreted to include not only the explicitly recited limits of about 82% and 90%, but also to include sub-ranges, such as 82-85%, 86-90%, and so forth, as well as individual amounts, including fractional amounts, within the specified ranges, such as 82.5%, 84.9%, 89.5%, for example.

The present disclosure is not to be limited in scope by the specific embodiments described herein, which are intended for the purposes of exemplification only. Functionally equivalent products, compositions, and methods are clearly within the scope of the disclosure, as described herein.

Bitumen's are too hard and brittle at low temperatures and too soft and deformable at elevated temperatures. So, bitumen is modified to improve the properties. Several research reports revealed the bitumen composition obtained using various modifiers such as polymers, plastomers, elastomers, cross-linking agents, natural rubber, crumb rubber, surfactants, and anti-aging agents. The use of sulphur in preparing the modified bitumen is well known and was adopted due to the cheap availability of sulphur as a refinery by-product. But the sulphur related problems have restricted the use of the sulphur modified bitumen. With an aim to sort the problems discussed in the prior arts/background section, the present disclosure provides an additive for modifying bitumen. The additive comprises sulphur, $H_2S$ suppressants, smell masking agent and bitumen. This sulphur additive is then utilized for preparing modified bitumen. The sulphur additive of the present disclosure further comprises olefin rich oil. The present disclosure also provides a process for preparing the sulphur additive and sulphur modified bitumen composition. The sulphur modified bitumen composition of the present disclosure complies with VG-30 specifications. $H_2S$ emission analysis also confirms the environmental compatibility of the bitumen composition of the present disclosure.

In an embodiment of the present disclosure, there is provided a sulphur additive for preparing modified bitumen, the additive comprising: a) sulphur with a weight percentage in the range of 90-95% with respect to the additive; b) at least two $H_2S$ suppressants with a combined weight percentage in the range of 4-7% with respect to the additive; c) bitumen with a weight percentage in the range of 0.5-3% with respect to the additive; and d) at least one smell masking agent in the range of 0.05-1.0% with respect to the additive.

In an embodiment of the present disclosure, there is provided a sulphur additive for preparing modified bitumen, the additive comprising: a) sulphur with a weight percentage in the range of 92-95% with respect to the additive; b) at least two $H_2S$ suppressants with a combined weight percentage in the range of 4-6% with respect to the additive; c) bitumen with a weight percentage in the range of 0.5-2% with respect to the additive; and d) at least one smell masking agent in the range of 0.05-0.5% with respect to the additive. In another embodiment of the present disclosure, there is provided an additive for preparing modified bitumen, the additive comprising: a) sulphur with a weight percentage in the range of 93-95% with respect to the additive; b) at least two $H_2S$ suppressants with a combined weight percentage in the range of 4.5-5% with respect to the additive; c) bitumen with a weight percentage in the range of 0.8-1.5% with respect to the additive; and d) at least one smell masking agent in the range of 0.08-0.3% with respect to the additive. In yet another embodiment of the present disclosure, there is provided an additive for preparing modified bitumen, the additive comprising: a) sulphur with a weight percentage in the range of 94-95% with respect to the additive; b) at least two $H_2S$ suppressants with a combined weight percentage in the range of 4.95-5.5% with respect to the additive; c) bitumen with a weight percentage of 1.0% with respect to the additive; and d) at least one smell masking agent with a weight percentage of 0.05% with respect to the additive.

In an embodiment of the present disclosure, there is provided a sulphur additive for preparing modified bitumen, the additive comprising: a) sulphur with a weight percentage in the range of 90-95% with respect to the additive; b) at least two $H_2S$ suppressants with a combined weight percentage in the range of 4-7% with respect to the additive; c) bitumen with a weight percentage in the range of 0.5-3% with respect to the additive; and d) at least one smell masking agent in the range of 0.05-1.0% with respect to the additive, wherein the sulphur is a refinery by-product.

In an embodiment of the present disclosure, there is provided a sulphur additive for preparing modified bitumen, the additive comprising: a) sulphur with a weight percentage in the range of 90-95% with respect to the additive; b) at least two $H_2S$ suppressants with a combined weight percentage in the range of 4-7% with respect to the additive; c) bitumen with a weight percentage in the range of 0.5-3% with respect to the additive; and d) at least one smell masking agent in the range of 0.05-1.0% with respect to the additive and wherein the at least two $H_2S$ suppressants is selected from the group consisting of an iron complex, bentonite clay, wood charcoal, refinery spent catalyst, and combinations thereof.

In an embodiment of the present disclosure, there is provided a sulphur additive for preparing modified bitumen, the additive comprising: a) sulphur with a weight percentage in the range of 90-95% with respect to the additive; b) at least two $H_2S$ suppressants with a combined weight percentage in the range of 4-7% with respect to the additive; c) bitumen with a weight percentage in the range of 0.5-3% with respect to the additive; and d) at least one smell masking agent in the range of 0.05-1.0% with respect to the additive, wherein the at least two $H_2S$ suppressants is selected from the group consisting of an iron complex, bentonite clay, wood charcoal, refinery spent catalyst, and combinations thereof and wherein the iron complex is iron(III) ethylhexanoate, refinery spent catalyst is refinery FCC spent catalyst or refinery DHDS spent catalyst.

In an embodiment of the present disclosure, there is provided a sulphur additive for preparing modified bitumen, the additive comprising: a) sulphur with a weight percentage in the range of 90-95% with respect to the additive; b) at least two $H_2S$ suppressants with a combined weight percentage in the range of 4-7% with respect to the additive; c) bitumen with a weight percentage in the range of 0.5-3% with respect to the additive; and d) at least one smell masking agent selected from the group consisting of amyl ester, isoamyl ester, phenyl amyl ester, vanillin, geraniol, and combinations thereof in the range of 0.05-1.0% with respect to the additive.

In an embodiment of the present disclosure, there is provided a sulphur additive for preparing modified bitumen, the additive comprising: a) a refinery by-product sulphur with a weight percentage in the range of 90-95% with respect to the additive; b) at least two $H_2S$ suppressants selected from the group consisting of an iron complex, bentonite clay, wood charcoal, refinery spent catalyst, and combinations thereof with a combined weight percentage in the range of 4-7% with respect to the additive; c) bitumen with a weight percentage in the range of 0.5-3% with respect to the additive; and d) at least one smell masking agent selected from the group consisting of amyl ester, isoamyl ester, phenyl amyl ester, vanillin, geraniol, and combinations thereof in the range of 0.05-1.0% with respect to the additive.

In an embodiment of the present disclosure, there is provided an additive, wherein the additive comprises a) sulphur with a weight percentage in the range of 82-90% with respect to the additive; b) at least two $H_2S$ suppressants with a combined weight percentage in the range of 4-7% with respect to the additive; c) bitumen with a weight percentage in the range of 0.5-3% with respect to the additive; d) at least one smell masking agent with a weight percentage in the range of 0.05-1.0% with respect to the additive; and e) at least one olefin rich oil with a weight percentage in the range of 7-10% with respect to the additive.

In an embodiment of the present disclosure, there is provided an additive, wherein the additive comprises a) sulphur with a weight percentage in the range of 83-87% with respect to the additive; b) at least two $H_2S$ suppressants with a combined weight percentage in the range of 4-5% with respect to the additive; c) bitumen with a weight percentage in the range of 0.7-1% with respect to the additive; d) at least one smell masking agent with a weight percentage in the range of 0.05-1.0% with respect to the additive; and e) at least one olefin rich oil with a weight percentage in the range of 8-10% with respect to the additive. In another embodiment of the present disclosure, wherein the additive comprises a) sulphur with a weight percentage in the range of 84-85% with respect to the additive; b) at least two $H_2S$ suppressants with a combined weight percentage in the range of 4.5-5.0% with respect to the additive; c) bitumen with a weight percentage in the range of 0.9-1.1% with respect to the additive; d) at least one smell masking agent with a weight percentage of 0.1% with respect to the additive; and e) at least one olefin rich oil with a weight percentage in the range of 9.0-9.5% with respect to the additive.

In an embodiment of the present disclosure, there is provided an additive, wherein the additive comprises a) sulphur with a weight percentage in the range of 82-90% with respect to the additive; b) at least two $H_2S$ suppressants with a combined weight percentage in the range of 4-7% with respect to the additive; c) bitumen with a weight percentage in the range of 0.5-3% with respect to the additive; d) at least one smell masking agent with a weight percentage in the range of 0.05-1.0% with respect to the additive; and e) at least one olefin rich oil with a weight percentage in the range of 7-10% with respect to the additive and wherein the sulphur is a refinery by-product.

In an embodiment of the present disclosure, there is provided an additive, wherein the additive comprises a) sulphur with a weight percentage in the range of 82-90% with respect to the additive; b) at least two $H_2S$ suppressants with a combined weight percentage in the range of 4-7% with respect to the additive; c) bitumen with a weight percentage in the range of 0.5-3% with respect to the additive; d) at least one smell masking agent with a weight percentage in the range of 0.05-1.0% with respect to the additive; and e) at least one olefin rich oil with a weight percentage in the range of 7-10% with respect to the additive and wherein the at least two $H_2S$ suppressants is selected from the group consisting of an iron complex, bentonite clay, wood charcoal, refinery spent catalyst, and combinations thereof and wherein the iron complex is iron(III) ethylhexanoate and the refinery spent catalyst is refinery FCC spent catalyst or refinery DHDS spent catalyst.

In an embodiment of the present disclosure, there is provided an additive, wherein the additive comprises a) sulphur with a weight percentage in the range of 82-90% with respect to the additive; b) at least two $H_2S$ suppressants with a combined weight percentage in the range of 4-7% with respect to the additive; c) bitumen with a weight percentage in the range of 0.5-3% with respect to the additive; d) at least one smell masking agent with a weight percentage in the range of 0.05-1.0% with respect to the additive; and e) at least one olefin rich oil with a weight percentage in the range of 7-10% with respect to the additive and wherein the at least one olefin rich oil selected from the group consisting of high cut FCC naphtha, visbreaker naphtha, delayed coker naphtha, waste cooking oil, and combinations thereof.

In an embodiment of the present disclosure, there is provided an additive, wherein the additive comprises a) sulphur with a weight percentage in the range of 82-90% with respect to the additive; b) at least two $H_2S$ suppressants with a combined weight percentage in the range of 4-7% with respect to the additive; c) bitumen with a weight percentage in the range of 0.5-3% with respect to the additive; d) at least one smell masking agent with a weight percentage in the range of 0.05-1.0% with respect to the additive; and e) at least one olefin rich oil with a weight percentage in the range of 7-10% with respect to the additive and wherein the at least one smell masking agent is selected from the group consisting of amyl ester, isoamyl ester, phenyl amyl ester, vanillin, geraniol, and combinations thereof.

In an embodiment of the present disclosure, there is provided an additive, wherein the additive comprises a) a refinery by-product sulphur with a weight percentage in the range of 82-90% with respect to the additive; b) at least two $H_2S$ suppressants selected from the group consisting of an iron complex, bentonite clay, wood charcoal, refinery spent catalyst, and combinations thereof with a combined weight percentage in the range of 4-7% with respect to the additive; c) bitumen with a weight percentage in the range of 0.5-3% with respect to the additive; d) at least one smell masking agent selected from the group consisting of amyl ester, isoamyl ester, phenyl amyl ester, vanillin, geraniol, and combinations thereof with a weight percentage in the range of 0.05-1.0% with respect to the additive; and e) at least one olefin rich oil selected from the group consisting of high cut FCC naphtha, visbreaker naphtha, delayed coker naphtha, waste cooking oil, and combinations thereof with a weight percentage in the range of 7-10% with respect to the additive.

In an embodiment of the present disclosure, there is provided a sulphur additive for preparing modified bitumen, the additive comprising: a) sulphur with a weight percentage in the range of 90-95% with respect to the additive; b) at least two $H_2S$ suppressants with a combined weight percentage in the range of 4-7% with respect to the additive; c) bitumen with a weight percentage in the range of 0.5-3% with respect to the additive; and d) at least one smell masking agent in the range of 0.05-1.0% with respect to the additive, wherein the additive is in the form of pellets or powder.

In an embodiment of the present disclosure, there is provided an additive, the additive comprises a) sulphur with a weight percentage in the range of 82-90% with respect to the additive; b) at least two $H_2S$ suppressants with a combined weight percentage in the range of 4-7% with respect to the additive; c) bitumen with a weight percentage in the range of 0.5-3% with respect to the additive; d) at least one smell masking agent with a weight percentage in the range of 0.05-1.0% with respect to the additive; and e) at least one olefin rich oil with a weight percentage in the range of 7-10% with respect to the additive, wherein the additive is in the form of pellets or powder.

In an embodiment of the present disclosure, there is provided a process for the preparation of an additive, the additive comprising: a) sulphur with a weight percentage in the range of 90-95% with respect to the additive; b) at least two $H_2S$ suppressants with a combined weight percentage in the range of 4-7% with respect to the additive; c) bitumen with a weight percentage in the range of 0.5-3% with respect to the additive; and d) at least one smell masking agent in the range of 0.05-1.0% with respect to the additive, said process comprising the following steps: a) heating sulphur to obtain molten sulphur; b) contacting the molten sulphur with at least two $H_2S$ suppressants, bitumen and at least one smell masking agent to obtain a mixture; c) heating the mixture at a temperature in the range of 120-160° C. for a time period in the range of 20 minutes to 140 minutes to obtain a heated mixture; and d) cooling the heated mixture to obtain the additive.

In an embodiment of the present disclosure, there is provided a process for the preparation of an additive, said process comprising the following steps: a) heating sulphur with a weight percentage in the range of 90-95% to obtain molten sulphur; b) contacting the molten sulphur with at least two $H_2S$ suppressants with a combined weight percentage in the range of 4-7%, bitumen with a weight percentage in the range of 0.5-3% and at least one smell masking agent with a weight percentage in the range of 0.05-1% to obtain a mixture; c) heating the mixture at a temperature in the range of 120-160° C. for a time period in the range of 20 minutes to 140 minutes to obtain a heated mixture; and d) cooling the heated mixture to obtain the additive.

In an embodiment of the present disclosure, there is provided a process for the preparation of an additive as disclosed herein, said process comprising the following steps: a) heating refinery by-product sulphur to obtain molten sulphur; b) contacting the molten sulphur with at least two $H_2S$ suppressants selected from a group consisting of an iron complex, bentonite clay, wood charcoal, refinery spent catalyst, and combinations thereof, bitumen and at least one smell masking agent selected from the group consisting of amyl ester, isoamyl ester, phenyl amyl ester, vanillin, geraniol, and combinations thereof to obtain a mixture; c) heating the mixture at a temperature in the range of 120-160° C. for a time period in the range of 20 minutes to 140 minutes to obtain a heated mixture; and d) cooling the heated mixture to obtain the additive.

In an embodiment of the present disclosure, there is provided a process for the preparation of an additive as disclosed herein, said process comprising the following steps: a) heating refinery by-product sulphur with a weight percentage in the range of 90-95% to obtain molten sulphur; b) contacting the molten sulphur with at least two $H_2S$ suppressants with a weight percentage in the range of 4-7% selected from a group consisting of an iron complex, bentonite clay, wood charcoal, refinery spent catalyst, and combinations thereof, bitumen with a weight percentage in the range of 0.5-3% and at least one smell masking agent with a weight percentage in the range of 0.05-1.0% selected from the group consisting of amyl ester, isoamyl ester, phenyl amyl ester, vanillin, geraniol, and combinations thereof to obtain a mixture; c) heating the mixture at a temperature in the range of 120-160° C. for a time period in the range of 20 minutes to 140 minutes to obtain a heated mixture; and d) cooling the heated mixture to obtain the additive.

In an embodiment of the present disclosure, there is provided a process for the preparation of an additive as disclosed herein, said process comprising the following steps: a) heating sulphur to obtain molten sulphur; b) contacting the molten sulphur with at least two $H_2S$ suppressants, bitumen, and at least one smell masking agent to obtain a mixture; c) heating the mixture at a temperature in the range of 120-160° C. for a time period in the range of 20 minutes to 140 minutes to obtain a heated mixture; and d) cooling the heated mixture to obtain the additive, wherein heating sulphur to obtain molten sulphur is done at a temperature in the range of 130-150° C. In another embodiment of the present disclosure, wherein heating sulphur to obtain molten sulphur is done at a temperature of 140° C.

In an embodiment of the present disclosure, there is provided a process for the preparation of an additive as disclosed herein, said process comprising the following steps: a) heating sulphur to obtain molten sulphur; b) contacting the molten sulphur with at least two $H_2S$ suppressants, bitumen, and at least one smell masking agent to obtain a mixture; c) heating the mixture at a temperature in the range of 120-160° C. for a time period in the range of 20 minutes to 140 minutes to obtain a heated mixture; and d) cooling the heated mixture to obtain the additive. In another embodiment of the present disclosure, there is provided a process for the preparation of an additive as disclosed herein, wherein heating the mixture at a temperature in the range of 130-150° C. for a time period in the range of 30 minutes to 120 minutes to obtain a heated mixture. In another embodiment of the present disclosure, there is provided a process for the preparation of an additive as disclosed herein, wherein heating the mixture at a temperature of 140° C. for a time period of 120 minutes to obtain a heated mixture.

In an embodiment of the present disclosure, there is provided a process for the preparation of an additive comprising a) sulphur with a weight percentage in the range of 82-90% with respect to the additive; b) at least two $H_2S$ suppressants with a combined weight percentage in the range of 4-7% with respect to the additive; c) bitumen with a weight percentage in the range of 0.5-3% with respect to the additive; d) at least one smell masking agent with a weight percentage in the range of 0.05-1.0% with respect to the additive; and e) at least one olefin rich oil with a weight percentage in the range of 7-10% with respect to the additive, said process comprising the following steps: a) heating sulphur to obtain molten sulphur; b) contacting the molten sulphur with at least one olefin rich oil at a temperature in the range of 120-160° C. for a time period in the range of 20 minutes to 200 minutes to obtain a first mixture; c) heating the first mixture with at least two $H_2S$ suppressants, bitumen and at least one smell masking agent at a temperature in the range of 120-160° C. for a time period in the range of 20 minutes to 140 minutes to obtain a heated mixture; and d) cooling the heated mixture to obtain the additive.

In an embodiment of the present disclosure, there is provided a process for the preparation of an additive, said process comprising the following steps: a) heating sulphur with a weight percentage in the range of 82-90% to obtain molten sulphur; b) contacting the molten sulphur with at least one olefin rich oil with a weight percentage in the range of 7-10, at a temperature in the range of 120-160° C. for a time period in the range of 20 minutes to 200 minutes to obtain a first mixture; c) heating the first mixture with at least two $H_2S$ suppressants with a combined weight percentage in the range of 4-7%, bitumen with a weight percentage in the range of 0.5-3% and at least one smell masking agent with a weight percentage in the range of 0.05-1.0% at a temperature in the range of 120-160° C. for a time period in the range of 20 minutes to 140 minutes to obtain a heated mixture; and d) cooling the heated mixture to obtain the additive.

In an embodiment of the present disclosure, there is provided a process for the preparation of an additive, said process comprising the following steps: a) heating a refinery by-product sulphur to obtain molten sulphur; b) contacting the molten sulphur with at least one olefin rich oil selected from the group consisting of high cut FCC naphtha, visbreaker naphtha, delayed coker naphtha, waste cooking oil, and combinations thereof, at a temperature in the range of 120-160° C. for a time period in the range of 20 minutes to 200 minutes to obtain a first mixture; c) heating the first mixture with at least two $H_2S$ suppressants selected from the group consisting of an iron complex, bentonite clay, wood charcoal, refinery spent catalyst, and combinations thereof, bitumen and at least one smell masking agent selected from the group consisting of amyl ester, isoamyl ester, phenyl amyl ester, vanillin, geraniol, and combinations thereof at a temperature in the range of 120-160° C. for a time period in the range of 20 minutes to 140 minutes to obtain a heated mixture; and d) cooling the heated mixture to obtain the additive.

In an embodiment of the present disclosure, there is provided a process for the preparation of an additive as disclosed herein, said process comprising the following steps: a) heating sulphur at a temperature in the range of 130 to 160° C. to obtain molten sulphur; b) contacting the molten sulphur with at least one olefin rich oil at a temperature in the range of 120-160° C. for a time period in the range of 20 minutes to 200 minutes to obtain a first mixture; c) heating the first mixture with at least two $H_2S$ suppressants, bitumen and at least one smell masking agent at a temperature in the range of 120-160° C. for a time period in the range of 20 minutes to 140 minutes to obtain a heated mixture; and d) cooling the heated mixture to obtain the additive. In another embodiment of the present disclosure, wherein heating sulphur is done at a temperature of 150° C. to obtain molten sulphur.

In an embodiment of the present disclosure, there is provided a process for the preparation of an additive as disclosed herein, said process comprising the following steps: a) heating sulphur to obtain molten sulphur; b) contacting the molten sulphur with at least one olefin rich oil at a temperature in the range of 120-150° C. for a time period in the range of 40 minutes to 190 minutes to obtain a first mixture; c) heating the first mixture with at least two $H_2S$ suppressants, bitumen and at least one smell masking agent at a temperature in the range of 120-150° C. for a time period in the range of 40 minutes to 130 minutes to obtain a heated mixture; and d) cooling the heated mixture to obtain the additive. In another embodiment of the present disclosure, wherein contacting the molten sulphur with at least one olefin rich oil at a temperature of 150° C. for a time period 120 minutes to obtain a first mixture; c) heating the first mixture with at least two $H_2S$ suppressants, bitumen and smell masking agent at a temperature of 140° C. for a time period in the range of 40 minutes to 60 minutes to obtain a heated mixture; and d) cooling the heated mixture to obtain the additive.

In an embodiment of the present disclosure, there is provided a sulphur modified bitumen composition comprising a) bitumen with weight percentage in the range of 92-97% with respect to the composition; and b) at least one additive as disclosed herein with weight percentage in the range of 3-8% with respect to the composition.

In an embodiment of the present disclosure, there is provided a sulphur modified bitumen composition comprising a) bitumen with weight percentage in the range of 93-96% with respect to the composition; and b) at least one additive as disclosed herein with weight percentage in the range of 4-7% with respect to the composition. In another embodiment of the present disclosure, wherein bitumen is in the weight percentage of 95% with respect to the composition and at least one additive is in the weight percentage of 5% with respect to the composition.

In an embodiment of the present disclosure, there is provided a sulphur modified bitumen composition comprising a) bitumen with weight percentage in the range of 92-97% with respect to the composition; and b) at least one additive as disclosed herein with weight percentage in the range of 3-8% with respect to the composition and wherein the at least one additive comprises a) sulphur with a weight percentage in the range of 90-95% with respect to the additive; b) at least two $H_2S$ suppressants with a combined weight percentage in the range of 4-7% with respect to the additive; c) bitumen with a weight percentage in the range of 0.5-3% with respect to the additive; and d) at least one smell masking agent in the range of 0.05-1.0% with respect to the additive.

In an embodiment of the present disclosure, there is provided a sulphur modified bitumen composition comprising a) bitumen with weight percentage in the range of 92-97% with respect to the composition; and b) at least one additive as disclosed herein with weight percentage in the range of 3-8% with respect to the composition and wherein the at least one additive comprises a) sulphur with a weight percentage in the range of 82-90% with respect to the additive; b) at least two $H_2S$ suppressants with a combined weight percentage in the range of 4-7% with respect to the additive; c) bitumen with a weight percentage in the range of 0.5-3% with respect to the additive; d) at least one smell masking agent with a weight percentage in the range of 0.05-1.0% with respect to the additive; and e) at least one olefin rich oil with a weight percentage in the range of 7-10% with respect to the additive.

In an embodiment of the present disclosure, there is provided a process for the preparation of sulphur modified bitumen composition comprising a) bitumen in the weight percentage range of 92-97% and b) at least one additive in the weight percentage range of 3-8%, the process comprising: a) heating bitumen to obtain molten bitumen; and b) contacting molten bitumen with at least one additive to obtain sulphur modified bitumen composition.

In an embodiment of the present disclosure, there is provided a process for the preparation of sulphur modified bitumen composition comprising a) bitumen in the weight percentage range of 92-97% and b) at least one additive in the weight percentage range of 3-8%, the process comprising: a) heating bitumen to obtain molten bitumen; and b) contacting molten bitumen with at least one additive to obtain sulphur modified bitumen composition, wherein heating the bitumen at a temperature in the range of 120-160° C. to obtain molten bitumen.

In an embodiment of the present disclosure, there is provided a process for the preparation of sulphur modified bitumen composition comprising a) bitumen in the weight percentage range of 92-97% and b) at least one additive in the weight percentage range of 3-8%, the process comprising: a) heating bitumen to obtain molten bitumen; and b) contacting molten bitumen with at least one additive to obtain sulphur modified bitumen composition, wherein contacting the molten bitumen with at least one additive at a temperature in the range of 120-180° C. for a time period in the range of 15 minutes to 180 minutes, under stirring with a speed of 50-400 rpm.

In an embodiment of the present disclosure, there is provided a process for the preparation of sulphur modified bitumen composition as disclosed herein, wherein contacting the molten bitumen with at least one additive at a temperature in the range of 140-180° C. for a time period in the range of 15 minutes to 160 minutes, under stirring with a speed of 80-200 rpm. In another embodiment of the present disclosure, wherein contacting the molten bitumen with at least one additive at a temperature in the range of 140° C. for a time period of 120 minutes, under stirring with a speed of 100 rpm. In another embodiment of the present disclosure, wherein contacting is done at a temperature of 180° C. for a time period of 15 minutes, under stirring with a speed of 100 rpm. In one another embodiment of the present disclosure, wherein contacting is done at a temperature of 140° C. for a time period of 150 minutes, under stirring with a speed of 100 rpm.

In an embodiment of the present disclosure, there is provided a process for the preparation of sulphur modified bitumen composition comprising a) bitumen in the weight percentage range of 92-97% and b) at least one additive in the weight percentage range of 3-8%, the process comprising: a) heating bitumen to obtain molten bitumen; and b) contacting molten bitumen with at least one additive to obtain sulphur modified bitumen composition, wherein heating the bitumen at a temperature in the range of 120-160° C. to obtain molten bitumen and wherein contacting the molten bitumen with at least one additive at a temperature in the range of 120-180° C. for a time period in the range of 15 minutes to 180 minutes, under stirring with a speed of 50-400 rpm.

In an embodiment of the present disclosure, there is provided a process for the preparation of sulphur modified bitumen composition comprising a) bitumen in the weight percentage range of 93-96% and b) at least one additive in the weight percentage range of 4-7%, the process comprising: a) heating bitumen to obtain molten bitumen; and b) contacting molten bitumen with at least one additive to obtain sulphur modified bitumen composition, wherein heating the bitumen at a temperature in the range of 120-150° C. to obtain molten bitumen and wherein contacting the molten bitumen with at least one additive at a temperature in the range of 130-180° C. for a time period in the range of 15 minutes to 160 minutes, under stirring with a speed of 80-200 rpm.

In an embodiment of the present disclosure, there is provided a process for the preparation of sulphur modified bitumen composition comprising a) bitumen in the weight percentage of 95% and b) at least one additive in the weight percentage of 5%, the process comprising: a) heating bitumen to obtain molten bitumen; and b) contacting molten bitumen with at least one additive to obtain sulphur modified bitumen composition, wherein heating the bitumen at a temperature of 140° C. to obtain molten bitumen and wherein contacting the molten bitumen with at least one additive at a temperature of 140° C. for a time period in the range of 120 minutes to 150 minutes, under stirring with a speed of 100 rpm.

In an embodiment of the present disclosure, there is provided a process for the preparation of sulphur modified bitumen composition comprising a) bitumen in the weight percentage range of 95% and b) at least one additive in the weight percentage range of 5%, the process comprising: a) heating bitumen to obtain molten bitumen; and b) contacting molten bitumen with at least one additive to obtain sulphur modified bitumen composition, wherein heating the bitumen at a temperature of 140° C. to obtain molten bitumen and wherein contacting the molten bitumen with at least one additive at a temperature in the range of 180° C. for a time period of 15 minutes, under stirring with a speed of 100 rpm.

In an embodiment of the present disclosure, there is provided an additive as disclosed herein for use in modifying bitumen.

In an embodiment of the present disclosure, there is provided a sulphur modified bitumen as disclosed herein for use in surface paving.

In an embodiment of the present disclosure, there is provided a sulphur modified bitumen complying VG 30 specification. In another embodiment of the present disclosure, there is provided a sulphur modified bitumen complying penetration point, softening point and absolute viscosity of VG 30 (IS 73, 2013) specification.

Although the subject matter has been described in considerable detail with reference to certain preferred embodiments thereof, other embodiments are possible.

EXAMPLES

The disclosure will now be illustrated with working examples, which is intended to illustrate the working of disclosure and not intended to take restrictively to imply any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices, and materials are described herein. It is to be understood that this disclosure is not limited to particular methods, and experimental conditions described, as such methods and conditions may apply.

Sulphur is an abundant and very cheap refinery by-product. Bitumen is a major and valuable refinery product commonly used in road construction and waterproofing applications. In order to improve the mechanical properties of bitumen as well as to utilize the refinery sulphur, sulphur is added to modify the bitumen. However, $H_2S$ emission during the bitumen modification with sulphur is a serious drawback and environmental setback for this process. So, there is a need for effective sulphur additives, which minimizes the $H_2S$ emissions below the environmentally allowed range. The present disclosure discloses an additive comprising sulphur, at least two $H_2S$ suppressants, a smell masking agent and bitumen. $H_2S$ suppressants lower the emission of $H_2S$ by chemically reacting or by adsorption. In the present disclosure, the $H_2S$ suppressants are capable of adsorbing $H_2S$ chemically as well as physically. Smell masking agent masks the odour of $H_2S$ gas, most effectively it scavenges $H_2S$ gas and thereby eliminating/minimizing the $H_2S$ emission and the odour as well. The present disclosure also provides a sulphur additive (organic sulphur additive) that is prepared using olefin rich oil along with $H_2S$ suppressants, smell masking agent and bitumen. The olefin rich oil is also a refinery by-product or a domestic waste cooking oil. Bitumen was added to the additive since it is capable of binding the individual components and further enhances the strength of the additive. It can also act as a coloring agent to the additive.

The following examples demonstrate the criticality of the present disclosure, wherein each component along with preparation conditions as disclosed herein, is essential to obtain an additive for modifying bitumen. The properties of sulphur modified bitumen are largely dependent on the additive used and the preparation conditions. Any change in the weight ratios of each component as disclosed herein did not yield the desired bitumen product. Also, the preparation conditions such as temperature and time also play a key role in obtaining sulphur modified bitumen with desired VG 30 specifications.

Example 1

Preparation of Sulphur Additive for Bitumen Modification Sulphur Additive

The present disclosure provides an additive comprising a refinery by-product sulphur with the weight percentage in the range of 90-95%, at least two $H_2S$ suppressants with the weight percentage in the range of 4-7%; bitumen with a percentage in the range of 0.5-3%; and at least one smell masking agent with weight percentage in the range of 0.05-1%. $H_2S$ suppressant is selected from a group consisting of iron complex, bentonite clay, wood charcoal, refinery spent catalyst and combinations thereof. $H_2S$ suppressant is a combination of at least two components disclosed herein. These components suppress the formation of $H_2S$ by chemical reaction and by physical adsorption. The iron complex used in the present disclosure is iron(III) ethylhexanoate ($Fe(EHA)_3$) eliminates/minimizes $H_2S$ via a chemical reaction. Wood charcoal, bentonite clay, refinery spent catalyst could trap $H_2S$ via physical adsorption. Refinery spent catalyst is selected from a group consisting of refinery FCC spent catalyst, refinery DHDS spent catalyst or combinations thereof. Smell masking agent is selected from a group consisting of amyl ester, isoamyl ester, phenyl amyl ester, vanillin, geraniol, and combinations thereof. Smell masking agent is also an essential component, as it plays a dual role in masking the $H_2S$ odour and scavenging $H_2S$ as well. Table 1 provides various additive compositions comprising each component in specific weight ratios.

TABLE 1

| Component Category | Components | Sulphur additive -1 | Sulphur additive -2 | Sulphur additive -3 | Sulphur additive -4 | Sulphur additive -5 |
|---|---|---|---|---|---|---|
| Sulphur | Refinery sulphur (g) | 94.0 | 94.0 | 94.0 | 94.0 | 94.0 |
| $H_2S$ suppressants | Iron(III) ethylhexanoate (g) | 3.0 | 3.0 | 3.0 | 3.0 | 3.0 |
| | Bentonite clay (g) | 1.95 | 1.95 | 1.5 | 0 | 0 |
| | Wood charcoal (g) | 0 | 0 | 0.45 | 0 | 0 |
| | Refinery FCC spent catalyst (g) | 0 | 0 | 0 | 1.95 | 0 |
| | Refinery DHDS spent catalyst (g) | 0 | 0 | 0 | 0 | 1.95 |
| Bitumen | Bitumen (g) | 1.0 | 1.0 | 1.0 | 1.0 | 1.0 |
| Smell masking agent | Isoamyl ester (g) | 0.05 | 0 | 0 | 0.05 | 0.05 |
| | Phenyl amyl ester (g) | 0 | 0.05 | 0.05 | 0 | 0 |

Table 1 shows sulphur additives-1 to 5 of the present disclosure obtained by varying the components and the corresponding weight ratios.

For example, sulphur additive-1 comprised 94 g of refinery sulphur with 3.0 g of iron ethylhexanoate, 1.95 g of bentonite clay, 0.05 g of isoamyl ester the smell masking agent and 1.0 g of bitumen. Sulphur additive-2 comprised 94 g of refinery sulphur with 3.0 g of iron ethylhexanoate, 1.95 g of bentonite clay, 0.05 g of phenyl amyl ester the smell masking agent and 1.0 g of bitumen. Sulphur additive-3 was obtained from 94.0 g of refinery sulphur with 3.0 g of iron ethylhexanoate, 1.5 g of bentonite clay, 0.45 g of wood charcoal, 0.05 g of phenyl amyl ester the smell masking agent and 1.0 g of bitumen. Similarly, sulphur additives-4 and -5 were obtained from 94 g of refinery sulphur with 3.0 g of iron ethylhexanoate, 1.95 g of refinery spent catalyst, 0.05 g of isoamyl ester the smell masking agent and 1.0 g of bitumen, wherein the refinery spent FCC catalyst was used for sulphur additive-4 and Refinery DHDS spent catalyst was chosen for obtaining sulphur additive-5. It can be observed that these sulphur additives comprised at least two $H_2S$ suppressants and in sulphur additive-3 three $H_2S$ suppressants were added. The weight percentages of each component were very much within the disclosed ranges of the present disclosure.

For the purpose of defining refinery spent catalyst, ICP-OES (Inductively Coupled Plasma-optical emission spectrometry) measurements were carried out to explain the composition of the catalyst used. Table 2 represents the ICP-OES analysis data of some of the major components present in refinery DHDS spent catalyst and refinery FCC spent catalyst.

TABLE 2

| Refinery spent catalyst | Al % | Si % | Ca ppm | Co ppm | Fe ppm | Mo % | Ni % | V % | P % | K % | Na % |
|---|---|---|---|---|---|---|---|---|---|---|---|
| DHDS Spent | 3.3 | 12.8 | 134 | — | 3494 | 12.8 | 1.9 | — | 1.6 | 0.3 | 0.2 |
| FCC spent | 3.8 | 35 | 407 | 47 | 2000 | 0.04 | 2 | 0.1 | 2.1 | 0.1 | 0.2 |

Process for the Preparation of Sulphur Additive of the Present Disclosure

The process for preparing the sulphur additive is explained below herein. Sulphur was heated to obtain molten sulphur. To the molten sulphur, at least two $H_2S$ suppressants, at least one smell masking agent and bitumen were added to obtain a mixture. This mixture comprising all said components was heated at a temperature in the range of 120-160° C. for a time period in the range of 20-140 minutes to obtain a heated mixture. This heated mixture was then cooled to obtain the additive (sulphur additive) of the present disclosure.

In the present disclosure, for example, the sulphur additive 1 was prepared by the process disclosed herein. 94 g refinery sulphur was heated at a temperature of 140° C. for a time period of 30 minutes to obtain molten sulphur. To the molten sulphur, iron(III) ethylhexanoate (3 g; $H_2S$ suppressant) and bentonite clay (1.95 g; $H_2S$ suppressant) were added slowly in the same order at 140° C. and stirred for 30 minutes. Bitumen (1 g) was added to the mixture at 140° C. and stirred for 15 minutes. To this mixture, isoamyl ester (0.05 g; smell masking agent) was added at 140° C. and stirred for 5 minutes to obtain a heated mixture. The resulting heated mixture was poured into a water bath to obtain the sulphur additive pellets, which were then separated from the water bath and dried. This was considered as sulphur additive-1, which was further used for bitumen modification.

To further elucidate, sulphur additive-3 preparation is explained below. Refinery sulphur (94 g) was taken in a reactor and heated to 140° C. for 30 minutes to get molten sulphur. To the molten sulphur, iron(III) ethylhexanoate (3 g), bentonite clay (1.5 g) and wood charcoal (0.45 g) were added slowly in the same order at 140° C. and stirred for 30 minutes. Bitumen (1 g) was added to the mixture at 140° C. and stirred for 15 minutes. To this mixture, isoamyl ester (0.05 g) was added at 140° C. and stirred for 5 minutes to obtain a heated mixture. The resulting heated mixture is poured into a water bath to get the sulphur additive pellets, which were then separated from the water bath and dried. These sulphur additive-3 in pellet form was used further. Similarly, sulphur additives-2, 4, and 5 were prepared and obtained in pellets form.

Sulphur Additive (Organic Sulphur Additive)

The present disclosure provides an additive comprising a refinery by-product sulphur with the weight percentage in the range of 82-90%, at least two $H_2S$ suppressants with the weight percentage in the range of 4-7%; bitumen with percentage in the range of 0.5-3%; at least one smell masking agent with weight percentage in the range of 0.05-1%; and at least one olefin rich oil with a weight percentage in the range of 7-10%. This additive comprises olefin rich oil, and hence, can also be defined as organic sulphur additive. The $H_2S$ suppressants is selected from a group consisting of iron complex, bentonite clay, wood charcoal, refinery spent catalyst and combinations thereof. $H_2S$ suppressant is a combination of at least two components disclosed herein. Olefin rich oil is selected from a group consisting of high cut FCC naphtha, visbreaker naphtha, delayed coker naphtha, waste cooking oil, and combinations thereof. Waste cooking oil is an oil collected from restaurants, households or similar sources after their primary usage in cooking. High cut FCC naphtha, visbreaker naphtha, delayed coker naphtha were obtained refinery streams. Table 3 depicts the organic sulphur additive obtained from various components as described herein.

TABLE 3

| Component Category | Components | Organic Sulphur additive -6 | Organic Sulphur additive -7 | Organic Sulphur additive -8 |
|---|---|---|---|---|
| Sulphur | Refinery sulphur (g) | 85 | 85 | 85 |
| $H_2S$ suppressants | Iron(III) ethylhexanoate (g) | 2.8 | 2.8 | 2.8 |
| | Bentonite clay (g) | 1.8 | 1.8 | 1.8 |
| | Wood charcoal (g) | 0 | 0 | 0 |
| | Refinery FCC spent catalyst (g) | 0 | 0 | 0 |
| | Refinery DHDS spent catalyst (g) | 0 | 0 | 0 |
| Bitumen | Bitumen (g) | 0.9 | 0.9 | 0.9 |
| Smell masking agent | Vanillin (g) | 0.1 | 0.1 | 0.1 |
| Olefin rich oil | High cut FCC naphtha (g) | 9.4 | | |
| | Delayed coker naphtha (g) | | 9.4 | |
| | Waste cooking oil (g) | | | 9.4 |

Table 3 depicts various compositions for organic sulphur additives 6, 7 and 8. Organic sulphur additive-6 was obtained from 85 g of refinery sulphur with 2.8 g of iron ethylhexanoate, 1.8 g of bentonite clay, 0.1 g of vanillin the smell masking agent, 0.9 g of bitumen and 9.4 g of FCC naphtha. Organic sulphur additive-7 comprised 85 g of refinery sulphur with 2.8 g of iron ethylhexanoate, 1.8 g of bentonite clay, 0.1 g of vanillin the smell masking agent, 0.9 g of bitumen and 9.4 g of delayed coker naphtha. And similarly, organic sulphur additive-8 comprised 85 g of refinery sulphur with 2.8 g of iron ethylhexanoate, 1.8 g of bentonite clay, 0.1 g of vanillin the smell masking agent, 0.9 g of bitumen and 9.4 g of waste cooking oil.

To elucidate the characteristics of olefin rich oil, the carbon number (C6-C10) distribution was analyzed and is tabulated below in Table 4.

TABLE 4

| Carbon number | Olefin % in high cut FCC naphtha | Olefin % in delayed coaker naptha |
|---|---|---|
| C6 | 10.63% | 0.52% |
| C7 | 8.95% | 3.64% |
| C8 | 6.97% | 11.92% |
| C9 | 0.27% | 10.5% |
| C10 | 0.06% | 2.91% |

From Table 4, it can be observed that high cut FCC naphtha contains olefins of about 28% of C6-C10 olefins whereas delayed coker naphtha contains olefins of about 30 of C6-C10 olefins.

Process for the Preparation of Organic Sulphur Additive

The present disclosure provides a convenient preparation process for obtaining organic sulphur additives. The process followed is heating sulphur to obtain molten sulphur and then contacting the molten sulphur with at least one olefin rich oil at a temperature in the range of 120-160° C. for a time period in the range of 20 minutes to 200 minutes to obtain a first mixture. At least two $H_2S$ suppressants, bitumen, and at least one smell masking agent were added to this first mixture to obtain a mixture which was then heated at a temperature in the range of 120-160° C. for a time period in the range of 20 minutes to 140 minutes to obtain a heated mixture. This heated mixture was then cooled rapidly to obtain the additive (organic sulphur additive) of the present disclosure.

Organic sulphur additive-6 was prepared typically as explained below. Refinery sulphur (85 g) was taken in a two neck reactor with a condenser and heated to 150° C. for 30 minutes to get molten sulphur. To the molten sulphur, FCC naphtha (9.4 g) was added at 150° C. and stirred vigorously for 2 hours to obtain the first mixture. To the first mixture at 140° C., iron(III) ethylhexanoate (2.8 g) and bentonite clay (1.8 g) were added slowly in the same order at 140° C. and stirred for 30 minutes. Bitumen (0.9 g) was added to the mixture at 140° C. and stirred for 15 minutes. To this mixture, vanillin (0.1 g) was added at 140° C. and stirred for 5 minutes to obtain a heated mixture. The resulting heated mixture was poured into a water bath to obtain the organic sulphur additive pellets, which were then separated from the water bath and dried.

Similarly, organic sulphur additive-7 and -8 were prepared. The essential varying component was the olefin rich oil wherein organic sulphur additive-7 comprised delayed coker naphtha and organic sulphur additive-8 comprised waste cooking oil. Thus, the prepared organic sulphur additives 6, 7, and 8 were used for further bitumen modification.

Example 2

Sulphur Modified Bitumen

The present disclosure provides a sulphur modified bitumen composition comprising bitumen in the weight percentage of 92-97% with respect to the composition and an additive in the range of 3-8% with respect to the composition. The additive herein included the additive of the present disclosure, which may be sulphur additive or the organic sulphur additive as explained in example 1.

The process for preparing the sulphur modified bitumen is as follows. Bitumen was heated at a temperature in the range of 120-160° C. to obtain the molten bitumen, to this molten bitumen at least one sulphur additive was added at a temperature in the range of 120-180° C. for a time period in the range of 15 minutes to 150 minutes, under stirring with a speed of 50-400 rpm.

The preparation process defined herein is critical with respect to the composition as well as reaction temperature and time. Bitumen used for modification was the VG30 grade bitumen and the additive was selected from sulphur additives 1 to 5 and organic sulphur additive 6-8. Table 5 shows the various sulphur modified bitumen compositions.

TABLE 5

| | | Sulphur modified Bitumen (SMB) | | | | | | |
|---|---|---|---|---|---|---|---|---|
| | | SMB-1 | SMB-2 | SMB-3 | SMB-4 | SMB-5 | SMB-6 | SMB-7 |
| Bitumen (g) | | 95 | 95 | 95 | 95 | 95 | 90 | 95 |
| Additive used | Sulphur additive/ organic sulphur additive (g) | Sulphur additive-1 5 | Sulphur additive-1 5 | Sulphur additive-4 5 | Organic sulphur additive-6 5 | Sulphur additive-1 5 | Sulphur additive-1 10 | Organic sulphur additive-6 5 |
| Temperature ° C. | | 140 | 180 | 140 | 140 | 140 | 140 | 140 |
| Time (minutes) | | 120 | 15 | 120 | 150 | 60 | 120 | 120 |

Table 5 represents the preparation process for obtaining various sulphur modified bitumen (SMB) by varying the weight percentage and the preparation conditions such as temperature and time. The actual preparation process is defined hereinbelow. Sulphur modified bitumen-1 (SMB-1) was obtained by reacting 95 g of bitumen and 5 g of sulphur additive-1. Bitumen (VG 30 grade) (95 g) was taken in a reactor and heated to 140° C. to obtain the molten bitumen. To the molten bitumen, sulphur additive-1 (5 g) was added at 140° C. and stirred for 2 hours at 100 rpm to obtain SMB-1. Similarly, bitumen (VG 30 grade) (95 g) was taken in a reactor and heated to 180° C. To the molten bitumen, sulphur additive-1 (5 g) was added at 180° C. and stirred for 15 minutes at 100 rpm and SMB-2 was obtained. Bitumen (VG 30 grade) (95 g) was heated in a reactor at a temperature of 140° C. to obtain the molten bitumen. To this molten bitumen, sulphur additive-4 (5 g) was added at 140° C., stirred for 2 hours at 100 rpm and SMB-3 was obtained. In the similar process explained above and as per the conditions mentioned in Table 5, sulphur modified bitumen SMB-4, SMB-5, SMB-6, and SMB-7 were obtained.

Analysis of Sulphur Modified Bitumen

The sulphur modified bitumen obtained from the process explained above was subjected to various analyses. The aim of the present disclosure was to obtain a modified bitumen that can comply with VG 30 specifications. And the modified bitumen should essentially have a minimum or no $H_2S$ liberation. Accordingly, the sulphur modified bitumen was tested and the results were tabulated. Table 6 shows the analytical measurements of SMB-1 to 7.

TABLE 6

| Measurements | VG 30 specifications | SMB-1 | SMB-2 | SMB-3 | SMB-4 | SMB-5 | SMB-6 | SMB-7 |
|---|---|---|---|---|---|---|---|---|
| Penetration point at 25° C. | Min. 45 | 46 | 53 | 49 | 49 | 49 | 51 | 50 |
| Softening point, ° C. | Min. 47 | 49.9 | 48.8 | 49.3 | 48.5 | 48.1 | 47.2 | 47.5 |
| Absolute viscosity at 60° C., Poises | 2400-3600 | 2720 | 2524 | 2472 | 2510 | 2210 | 1950 | 2150 |
| Kinematic viscosity at 135° C., cSt | Min. 350 | 484 | 418 | 409 | 425 | 410 | 395 | 408 |
| Tests on residue from rolling thin film oven test: | | | | | | | | |
| Viscosity ratio at 60° C., | Max. 4 | 2.62 | 3.22 | 2.74 | 2.86 | NA | NA | NA |
| Ductility at 25° C. | Min. 40 | 100+ | 100+ | 100+ | 100+ | NA | NA | NA |
| $H_2S$ liberation ppm | — | 0.5 | 0 | 2.1 | 2.5 | 0 | 11.2 | 1.5 |

Table 6 clearly illustrates the properties of the sulphur modified bitumen of the present disclosure. For a modified bitumen to exhibit VG 30 specifications the parameters such as penetration point, softening point, absolute viscosity, kinematic viscosity should fall in the range as shown in Table 6. The important parameter to be noted in the sulphur modified bitumen is the absolute viscosity at 60° C. Absolute viscosity should be in the range of 2400-3600 poises at 60° C. SMB-1, SIB-2, SMB-3 and SMB-4 of the present disclosure had absolute viscosity of 2720, 2524, 2472 and 2510 poises respectively, which falls within the specified range, whereas the SMB-5, SMB-6, and SMB-7 had absolute viscosity of 2210, 1950 and 2150 poises respectively which were outside the specified range. Hence SMB 1 to 4 are sulphur modified bitumen are considered to be working examples for sulphur modified bitumen compositions.

Table 6 also showed the rolling thin film oven test results of SMB-1 to 4, wherein the viscosity ratio and ductility were measured. It can be deduced that the viscosity ratio at 60° C. and ductility at 25° C. were well within the specified ranges. SMB-5, SMB-6, and SMB-7 were not favored due to its properties, which were largely dependent on the composition and the preparation conditions as described previously. SMB-5 is considered as a negative example since the preparation conditions were not appropriate. SMB-5 was obtained from bitumen and sulphur additive-1 reacting at 140° C. for a time period of 60 minutes. The preparation time of 60 minutes was insufficient, for the temperature at 140° C. a time period of 120 minutes was desired. And hence this process condition of 140° C. for a time period of 60 minutes did not yield desired sulphur modified bitumen.

In case of SMB-6, about 10 g of sulphur additive-1 was added to 90 g of bitumen. The weight percentage of sulphur additive-1 fell outside the disclosed range of 3-8%, hence ended in undesired bitumen product (SMB-6). In the above examples provided, SMB-7 was obtained by contacting organic sulphur additive-6 with bitumen at 140° C. for 120 minutes. But this preparation time period was inadequate in-case of organic sulphur additive. For SMB obtained using organic sulphur additive, at a temperature of 140° C., a time period of 150 minutes was crucial. Thus, it can be inferred that the weight percentages and the preparation temperature and time period are so vital to obtain sulphur modified bitumen of VG 30 specifications.

Table 6 also depicts the $H_2S$ liberation data, which is the most critical characteristic property of the sulphur modified bitumen. $H_2S$ liberation during the reaction was monitored using a multi-gas detector. It can be seen that all the SMB-1, 2, 3, and 4 had $H_2S$ liberation less than 10 ppm which was environmentally favorable. SMB-2 had no $H_2S$ liberation at all and SMB-1 had the least $H_2S$ liberation of 0.5 ppm. SMB-3 and SMB-4 had 2.1 and 2.5 ppm of $H_2S$ liberations, respectively. It is to be noted that the combination of $H_2S$ suppressants plays a key role in obtaining the most favored sulphur modified bitumen product.

SMB-1 and SMB-3 were prepared in a similar manner but the differentiating factor was the $H_2S$ suppressants used in obtaining the sulphur additive. Of the SMB-1 and SMB-3, SMB-1 having the suppressants iron complex, bentonite clay had enhanced properties compared to SMB-3 having refinery spent catalyst as $H_2S$ suppressants. SMB-1 had only 0.5 ppm liberation of $H_2S$ and higher absolute viscosity of 2720 poises whereas SMB-3 had 2.1 ppm liberation of $H_2S$ with 2472 poises of absolute viscosity. Both were within the desired VG 30 specification of sulphur modified bitumen but the most favored one with enhanced properties was found to be SMB-1 compared to SMB-3.

Although the subject matter has been described in considerable detail with reference to certain examples and implementations thereof, other implementations are possible.

Advantages of the Present Disclosure

The present disclosure provides a sulphur additive for preparing bitumen comprising 90-95 weight percentage of sulphur, 4-7 weight percentage of at least two $H_2S$ suppressants, 0.5-3 weight percentage of bitumen and 0.05-1.0 weight percentage of at least one smell masking agent. The present disclosure also provides an additive for preparing bitumen comprising 82-90 weight percentage of sulphur, 4-7 weight percentage of at least two $H_2S$ suppressants, 0.5-3 weight percentage of bitumen, 0.05-1.0 weight percentage of at least one smell masking agent and 7-10 weight percentage of at least one olefin rich oil. The sulphur used in the present disclosure is the refinery by-product. The present disclosure discloses a combination of at least two $H_2S$ suppressants selected from a group consisting of iron complex, bentonite clay, wood charcoal, refinery spent catalyst, and combinations thereof. $H_2S$ suppressants eliminate/minimize the liberation of $H_2S$ by chemical reaction and by physical adsorption. Smell masking agent of the present disclosure plays an essential role in masking the $H_2S$ odour as well as in scavenging the liberated $H_2S$. The present disclosure describes a systematic preparation process for sulphur additive and also for obtaining sulphur modified bitumen. The sulphur modified bitumen of the present disclosure complies with the VG 30 specifications with respect to penetration point, softening point, absolute viscosity and kinematic viscosity. The sulphur modified bitumen have no or the least $H_2S$ liberation and hence is environmentally desired. The sulphur modified bitumen of the present disclosure finds its use in road pavements which can withstand heavy traffic and heavy loading.

The invention claimed is:

1. A process for preparing sulphur modified bitumen composition, the process consisting of:

heating bitumen at a temperature in a range of 120-160° C. to obtain molten bitumen;

preparing a sulphur additive; and contacting 95% of molten bitumen with 5% of sulphur additive at 180° C. for 15 minutes under stirring at a speed of 50-400 rpm to obtain the sulphur modified bitumen composition, wherein preparing the sulphur additive consists of:

heating sulphur to obtain molten sulphur, wherein the sulphur is a refinery by-product;

contacting the molten sulphur with two $H_2S$ suppressants, bitumen, and at least one smell masking agent to obtain a mixture, wherein one of the two $H_2S$ suppressants is iron (III) ethylhexanoate ($Fe(EHA)_3$) and the other $H_2S$ suppressant is bentonite clay, wood, charcoal, refinery FCC (Fluid Catalytic Cracking) spent catalyst, refinery DHDS (Diesel Hydrodesulphurization) spent catalyst, or a combinations thereof;

heating the mixture at a temperature in a range of 120-160 for a time period in a range of 20 minutes to 140 minutes to obtain a heated mixture; and cooling the heated mixture to obtain the sulphur additive.

2. The process as claimed in claim 1, wherein the sulphur additive comprises:

sulphur in a range of 90-95 wt % of the sulphur additive;

the two $H_2S$ suppressants combined in a range of 4-7 wt % of the sulphur additive;

bitumen in a range of 0.5-3 wt % of the sulphur additive; and the at least one smell masking agent in a range of 0.05-1.0 wt % of the sulphur additive.

3. The process as claimed in claim 1, wherein the at least one smell masking agent is selected from the group consisting of amyl ester, isoamyl ester, phenyl amyl ester, and combinations thereof.

4. The process as claimed in claim 1, wherein the sulphur additive is in a form of pellets or a powder.

5. The process as claimed in claim 1, wherein the sulphur modified bitumen has a penetration point of at least 45 at 25° C., has a softening point of at least 47° C., and has an absolute viscosity in a range of 2400 and 3600 poises at 60° C.

* * * * *